(12) United States Patent
Miyazawa et al.

(10) Patent No.: US 11,090,591 B2
(45) Date of Patent: Aug. 17, 2021

(54) SWIRLING FLOW GENERATION DEVICE AND DEPOSITION DEVICE

(71) Applicant: SEIKO EPSON CORPORATION, Tokyo (JP)

(72) Inventors: Kazuma Miyazawa, Nagano (JP); Kunihiro Sasaoka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 56 days.

(21) Appl. No.: 16/727,104

(22) Filed: Dec. 26, 2019

(65) Prior Publication Data

US 2020/0206668 A1 Jul. 2, 2020

(30) Foreign Application Priority Data

Dec. 28, 2018 (JP) .............................. JP2018-248036

(51) Int. Cl.
| | |
|---|---|
| *B01D 45/00* | (2006.01) |
| *B01D 45/14* | (2006.01) |
| *B04C 3/06* | (2006.01) |
| *B04C 3/00* | (2006.01) |
| *D21F 9/00* | (2006.01) |
| *D21B 1/34* | (2006.01) |
| *D21B 1/32* | (2006.01) |
| *D21D 5/06* | (2006.01) |

(52) U.S. Cl.
CPC ............... *B01D 45/14* (2013.01); *B04C 3/06* (2013.01); *B04C 2003/006* (2013.01); *D21B 1/32* (2013.01); *D21B 1/345* (2013.01); *D21D 5/06* (2013.01); *D21F 9/00* (2013.01)

(58) Field of Classification Search
CPC ..... B01D 45/14; B04C 3/06; B04C 2003/006; D21F 9/00; D21B 1/345; D21B 1/32; D21D 5/06
See application file for complete search history.

(56) References Cited

U.S. PATENT DOCUMENTS

| | | | | |
|---|---|---|---|---|
| 4,352,649 | A * | 10/1982 | Jacobsen ................ | D04H 1/736 19/296 |
| 4,640,810 | A * | 2/1987 | Laursen ................. | D04H 1/732 264/121 |
| 2004/0231108 | A1 * | 11/2004 | Thordahl ............... | D04H 1/732 19/296 |
| 2014/0027075 | A1 * | 1/2014 | Yamagami ............ | D21C 5/025 162/4 |

(Continued)

FOREIGN PATENT DOCUMENTS

| | | |
|---|---|---|
| JP | 2004-292959 A | 10/2004 |
| JP | 2018-159140 A | 10/2018 |

(Continued)

*Primary Examiner* — Dung H Bui
(74) *Attorney, Agent, or Firm* — Global IP Counselors, LLP

(57) ABSTRACT

A swirling flow generation device includes a first pipe having a first pipe axis and through which gas passes, a second pipe having a second pipe axis in a direction different from the first pipe axis and communicates with downstream of the first pipe, and an airflow changing unit provided in the first pipe and having an opening eccentric from the first pipe axis. A swirling flow is formed in the second pipe as the center of the airflow passed through the opening flows into the second pipe at a position that is eccentric from the second pipe axis.

7 Claims, 8 Drawing Sheets

(56) References Cited

U.S. PATENT DOCUMENTS

2016/0145802 A1* 5/2016 Higuchi ................ D04H 1/732
 162/373
2016/0145803 A1* 5/2016 Higuchi ................ D21F 1/60
 162/357
2020/0131705 A1 4/2020 Higuchi

FOREIGN PATENT DOCUMENTS

WO 2018/173849 A1 9/2018
WO WO-2018173849 A1 * 9/2018 ............... D21F 1/74

* cited by examiner

SWIRLING FLOW GENERATION DEVICE AND DEPOSITION DEVICE

The present application is based on, and claims priority from JP Application Serial Number 2018-248036, filed Dec. 28, 2018, the disclosure of which is hereby incorporated by reference herein in its entirety.

BACKGROUND

1. Technical Field

The present disclosure relates to a swirling flow generation device and a deposition device.

2. Related Art

In recent years, environmental awareness has increased, and it has been demanded not only to reduce the amount of paper used, but also to recycle used paper.

As an apparatus for performing such reproduction, for example, a configuration having a crushing unit for crushing used paper, a defibrating unit for defibrating coarse debris, a separation unit that separates foreign substances from defibrated material defibrated at the defibrating unit, a deposition unit for depositing defibrated material from which foreign substances are removed, and a forming unit for forming deposits into a sheet can be employed. With this apparatus, the used paper can be reused as recycled paper.

Examples of the deposition unit include a configuration having a dispersion drum that disperses the defibrated material and a pipe that supplies the defibrated material to the dispersion drum. Moreover, by forming a swirling flow in the pipe and supplying the defibrated material into the dispersion drum together with the swirling flow, the defibrated material is loosened and dispersed uniformly when dispersed by the dispersion drum. For example, in JP-A-2004-292959, a swirling flow is formed in a pipe by providing a screw feeder in the pipe or providing a spiral pipeline in the pipe.

However, if a spiral pipeline is provided in the pipe, the apparatus configuration becomes complicated due to the installation of the spiral pipeline. Moreover, if the screw feeder is provided in the pipe, it is necessary to install a drive source thereof, and the apparatus configuration becomes complicated.

SUMMARY

The present disclosure can be realized in the following aspects.

According to an aspect of the present disclosure, there is provided a swirling flow generation device including a first pipe having a first pipe axis and through which gas passes, a second pipe having a second pipe axis in a direction different from the first pipe axis and communicating with downstream of the first pipe, and an airflow changing unit provided in the first pipe and having an opening eccentric from the first pipe axis.

According to another aspect of the present disclosure, there is provided a deposition device including the swirling flow generation device according to the present disclosure, and a drum installed downstream of the second pipe, having a plurality of through-holes on an outer peripheral portion, and rotating around a central axis, in which a downstream end portion of the second pipe communicates with an inside of the drum.

DESCRIPTION OF EXEMPLARY EMBODIMENTS

Hereinafter, a swirling flow generation device and a deposition device of the present disclosure will be described in detail based on preferred embodiments shown in the accompanying drawings.

First Embodiment

Figure 1:
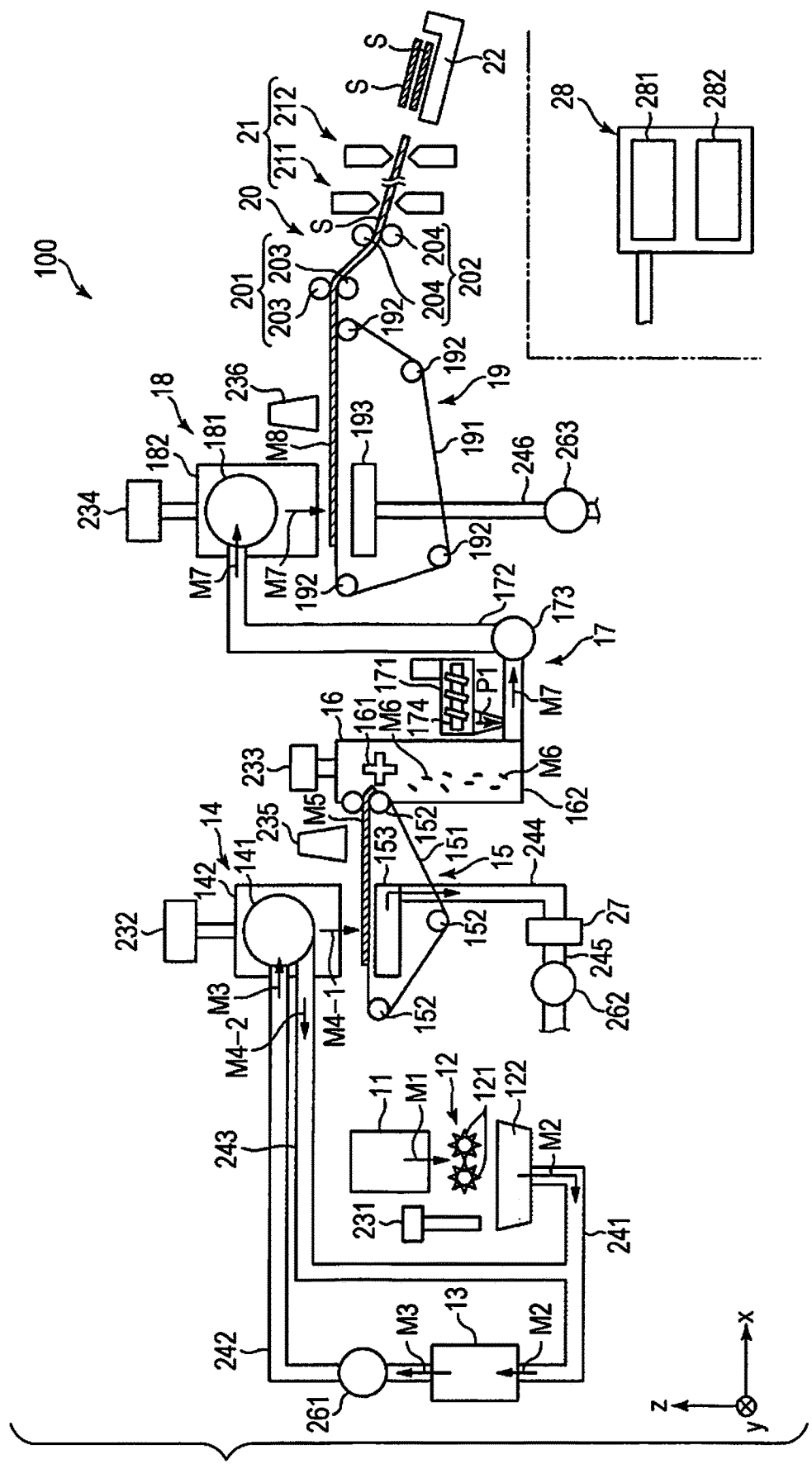
FIG. 1 is a schematic side surface view showing a first embodiment of a sheet manufacturing apparatus including a swirling flow generation device and a deposition device of the present disclosure.
Figure 2:
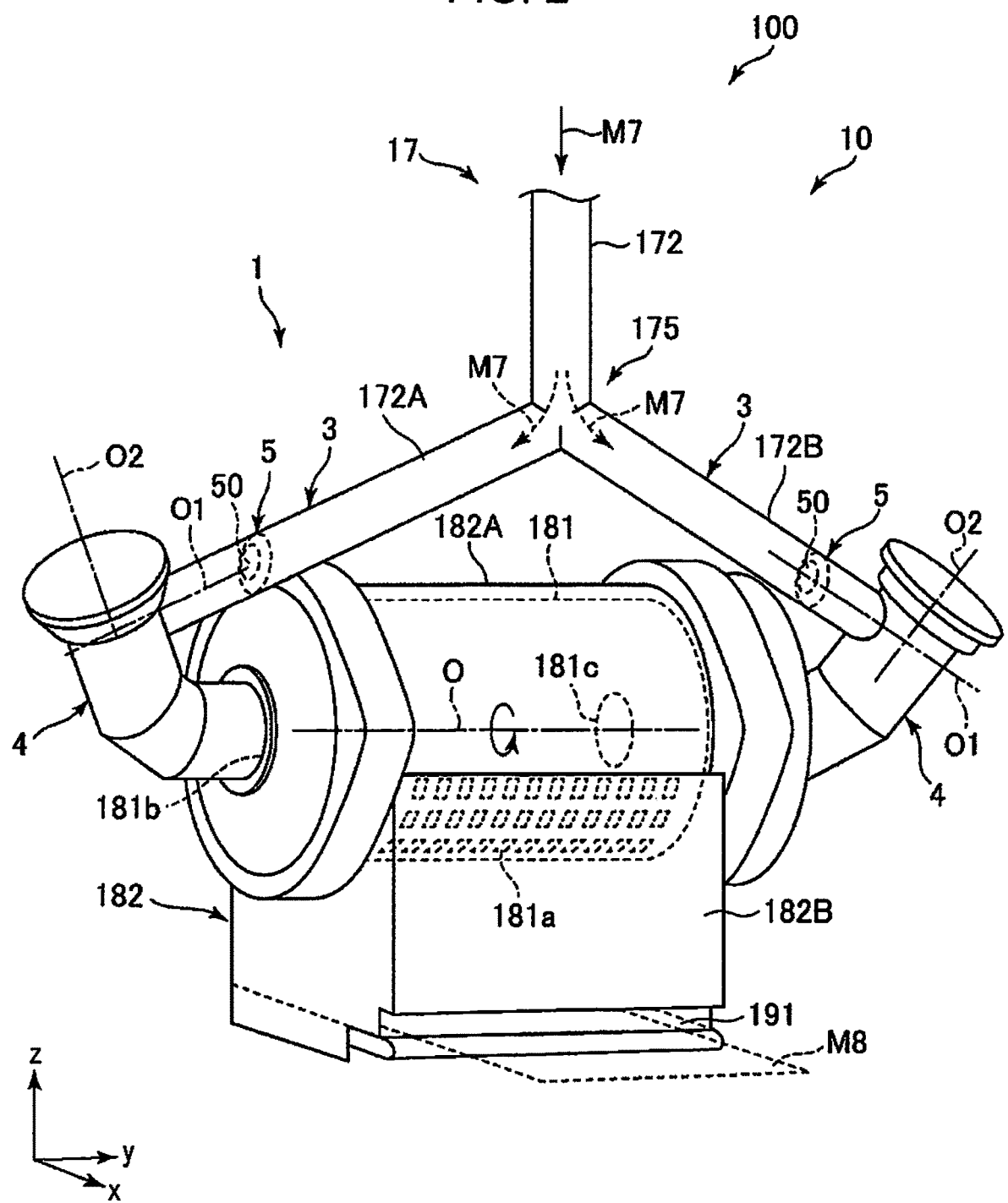
FIG. 2 is a perspective view of the swirling flow generation device and the deposition device shown in FIG. 1.
Figure 3:
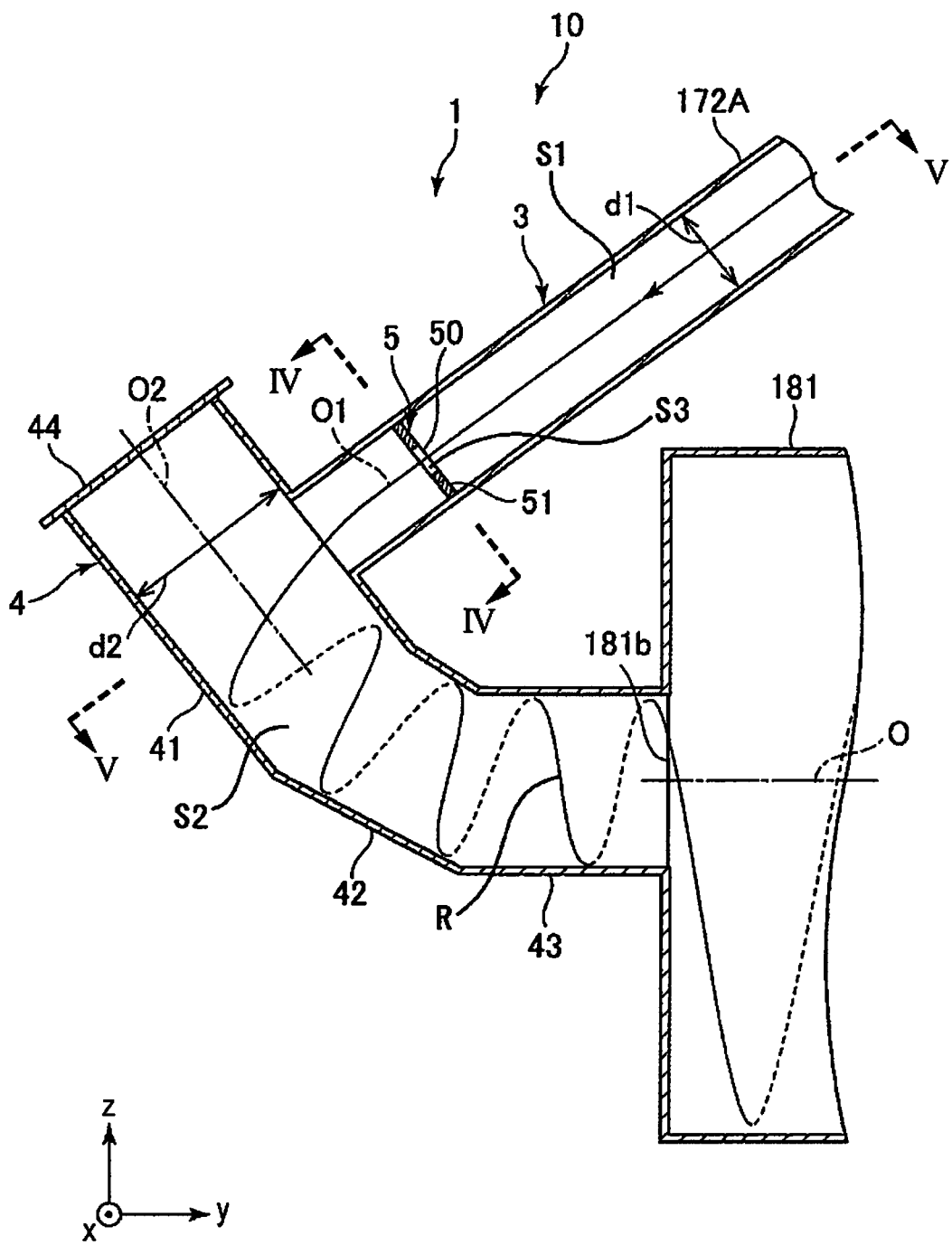
FIG. 3 is a longitudinal sectional view of the deposition device shown in FIG. 2.
Figure 4:
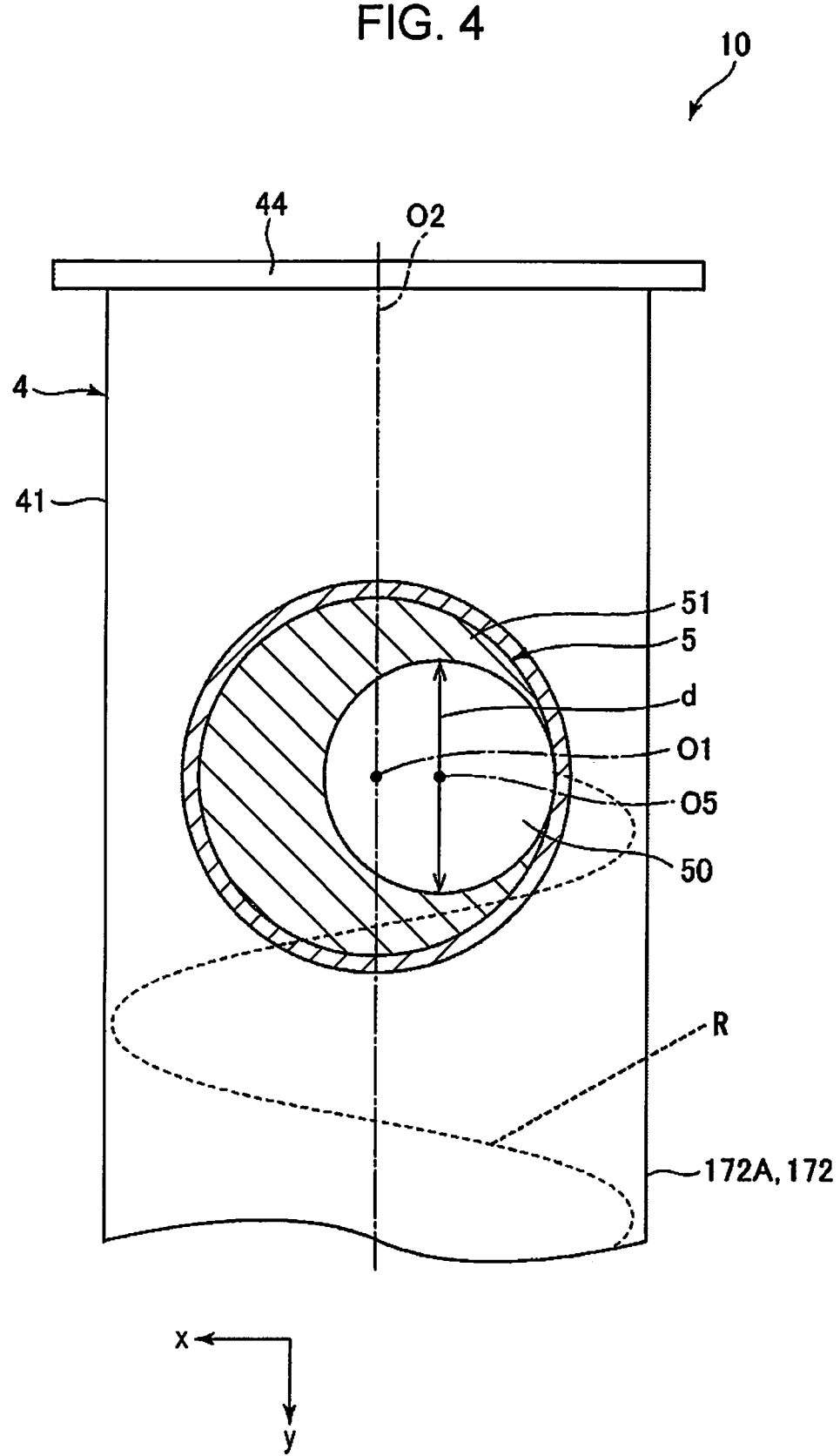
FIG. 4 is a cross-sectional view taken along line IV-IV in FIG. 3.
Figure 5:
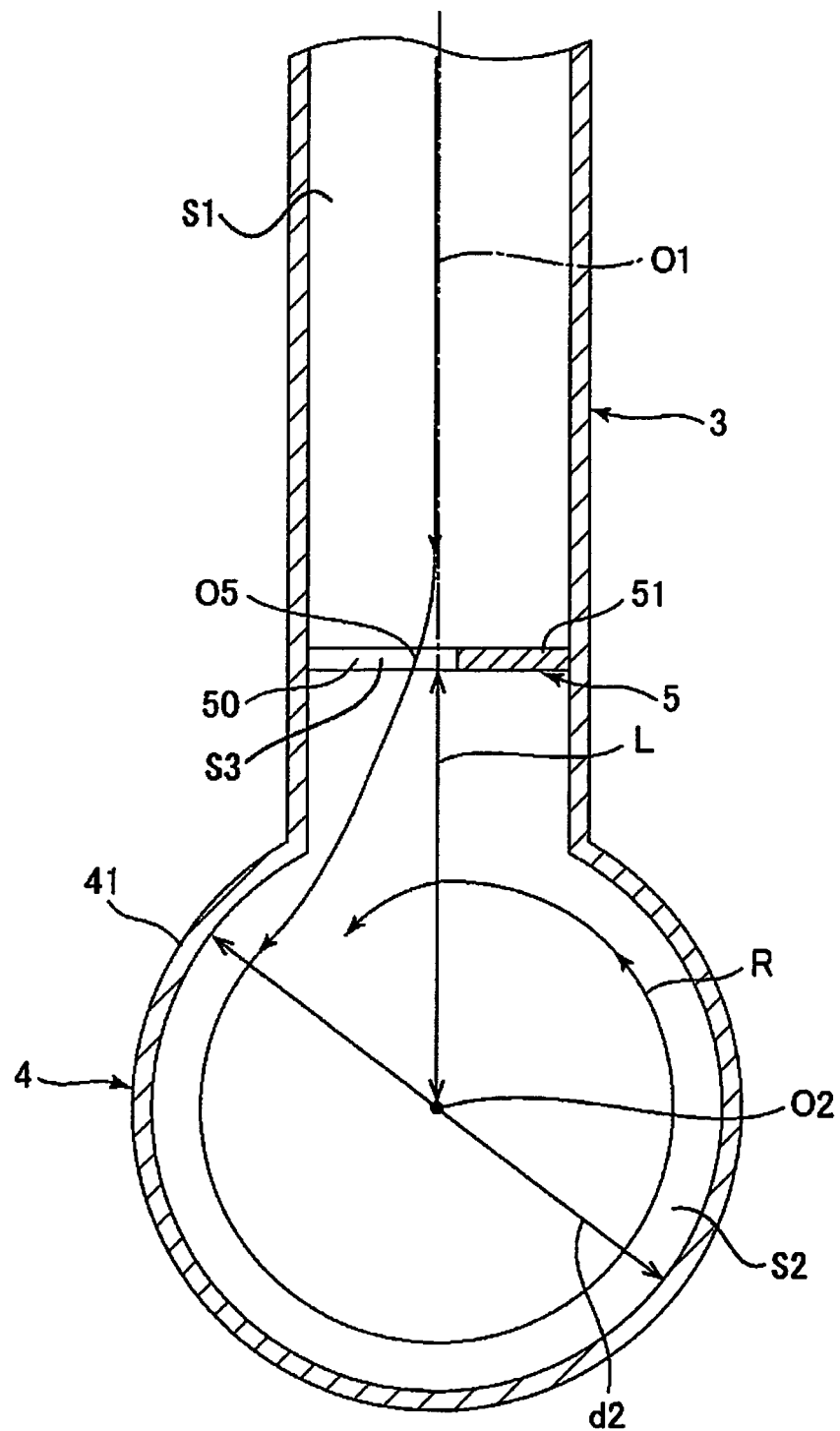
FIG. 5 is a cross-sectional view taken along line V-V in FIG. 3.
Figure 6:
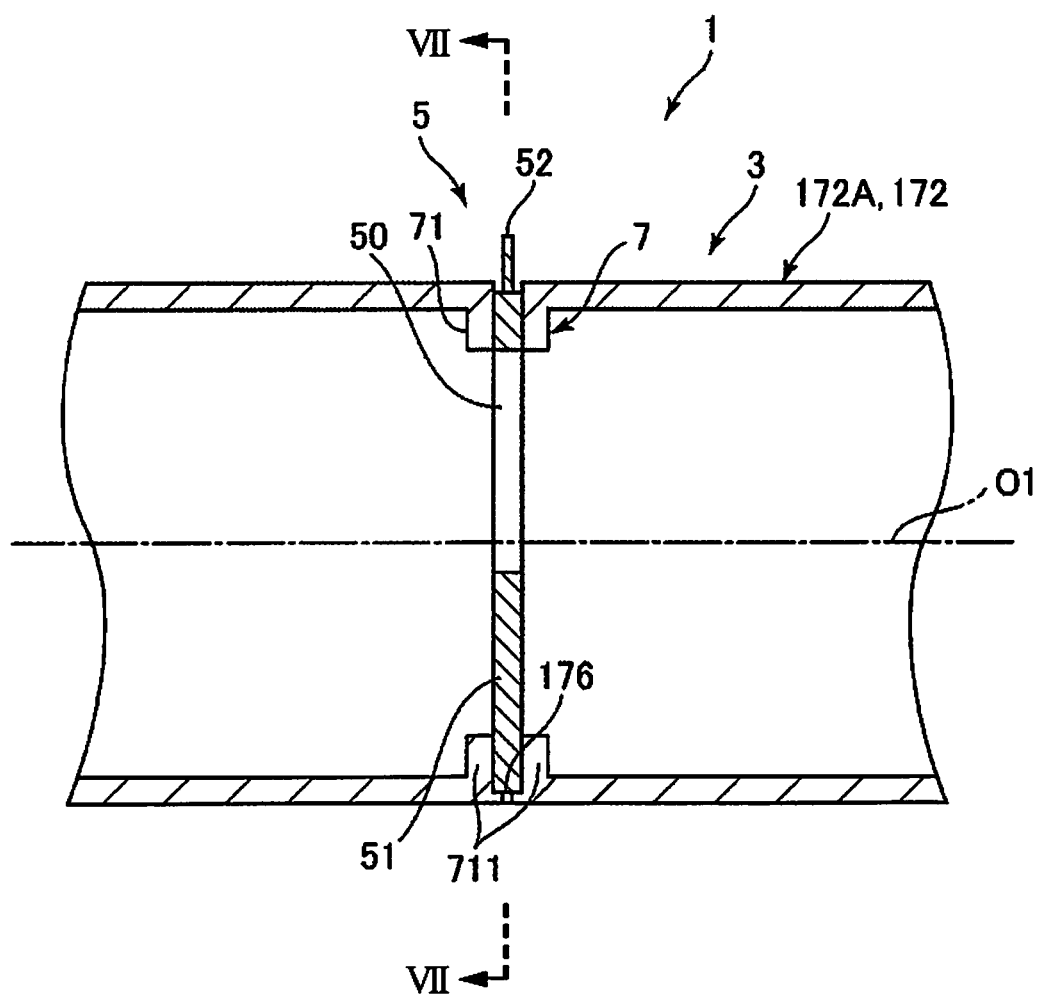
FIG. 6 is a longitudinal sectional view of a first pipe included in a second embodiment of the deposition device of the present disclosure.
Figure 7:
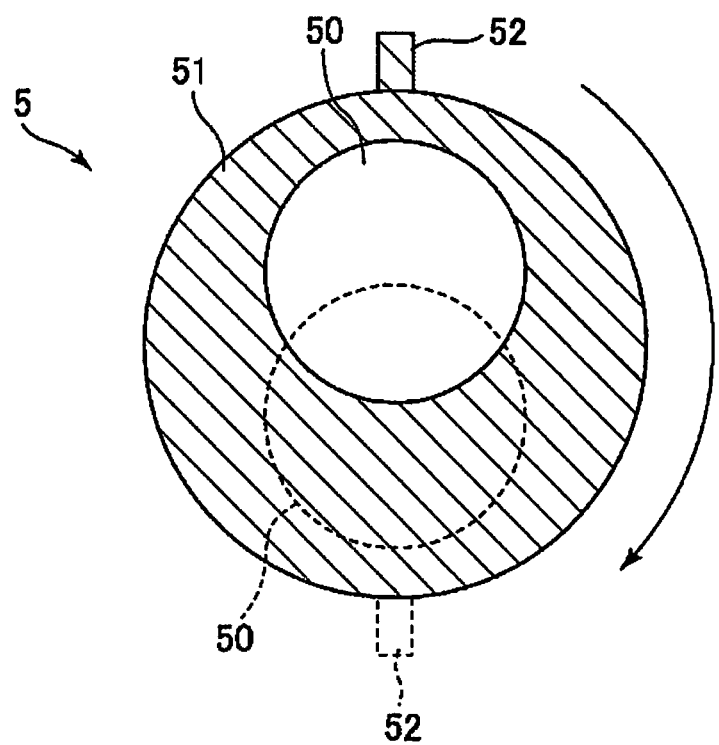
FIG. 7 is a cross-sectional view taken along line VII-VII in FIG. 6.
Figure 8:
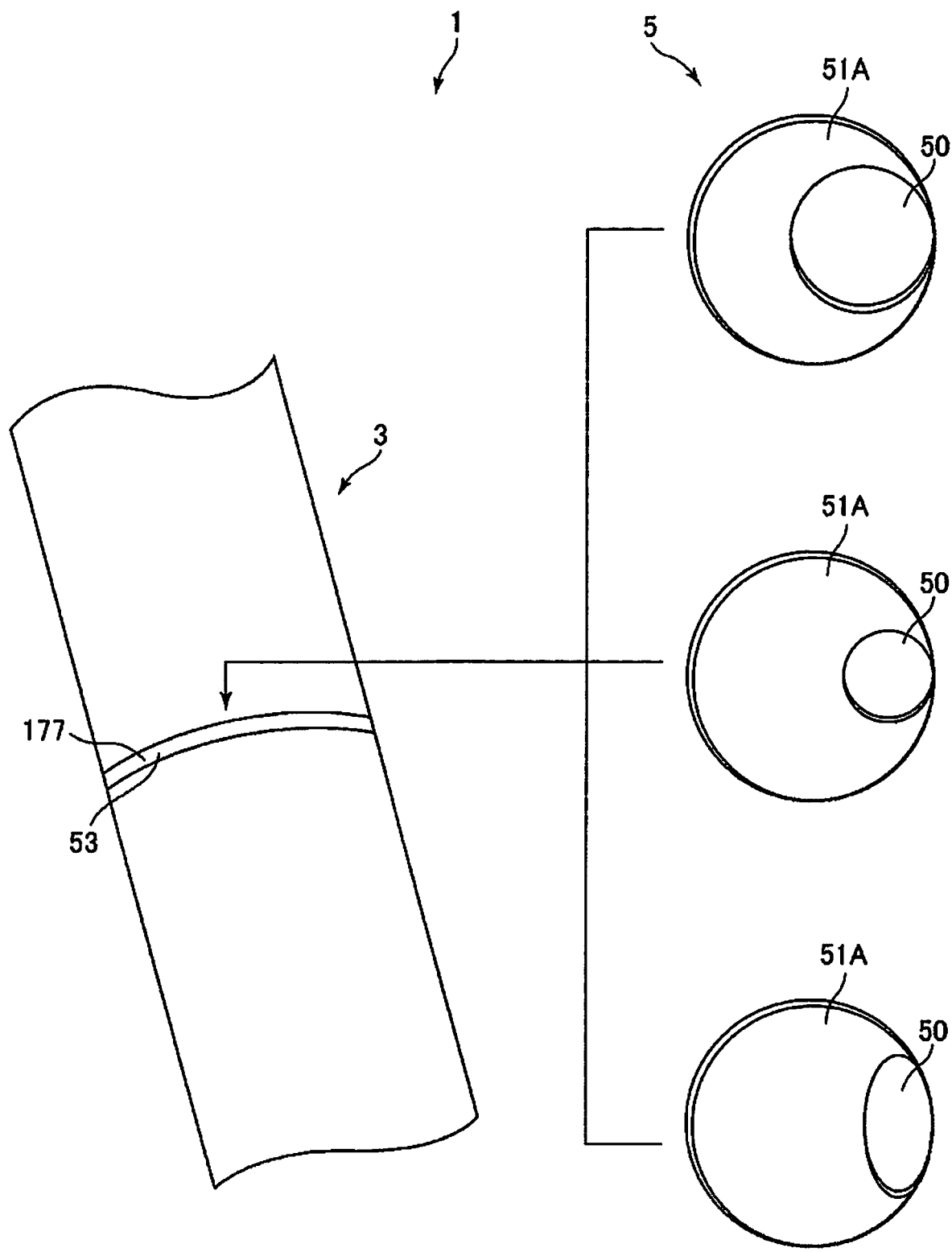
FIG. 8 is a perspective view of a first pipe and an airflow changing unit included in a third embodiment of the deposition device of the present disclosure.

FIG. 1 is a schematic side surface view showing a first embodiment of a sheet manufacturing apparatus including a swirling flow generation device and a deposition device of the present disclosure. FIG. 2 is a perspective view of the swirling flow generation device and the deposition device shown in FIG. 1. FIG. 3 is a longitudinal sectional view of the deposition device shown in FIG. 2. FIG. 4 is a cross-sectional view taken along line IV-IV in FIG. 3. FIG. 5 is a cross-sectional view taken along line V-V in FIG. 3. FIG. 6 is a longitudinal sectional view of a first pipe included in a second embodiment of the deposition device of the present disclosure. FIG. 7 is a cross-sectional view taken along line VII-VII in FIG. 6. FIG. 8 is a perspective view of a first pipe and an airflow changing unit included in a third embodiment of the deposition device of the present disclosure.

In the following, for convenience of explanation, as shown in FIGS. 1 to 4, three axes orthogonal to each other are referred to as an x axis, a y axis, and a z axis. The xy plane including the x axis and the y axis is horizontal, and the z axis is vertical. The direction in which the arrow of each axis points is called "+", and the opposite direction is called "−". Also, the upper side of FIG. 1 and FIGS. 3 to 8 may be referred to as "upper" or "above", and the lower side may be referred to as "lower" or "below".

As shown in FIG. 1, a sheet manufacturing apparatus 100 includes a raw material supply unit 11, a crushing unit 12, a defibrating unit 13, a sorting unit 14, a first web forming unit 15, a subdividing unit 16, a mixing unit 17, a loosening unit 18, a second web forming unit 19, a sheet forming unit 20, a cutting unit 21, a stock unit 22, a collection unit 27, and a control unit 28. Each of these units is electrically coupled to the control unit 28, and the operation thereof is controlled by the control unit 28.

The control unit 28 has a central processing unit (CPU) 281 and a storage unit 282. For example, the CPU 281 can perform various determinations and various instructions.

The storage unit 282 stores various programs such as a program for manufacturing a sheet S, for example.

The control unit 28 may be incorporated in the sheet manufacturing apparatus 100, or may be provided in an external device such as an external computer. For example, the external device may communicate with the sheet manufacturing apparatus 100 via a cable or the like or may be coupled to the sheet manufacturing apparatus 100 via a network such as the Internet in the case of wireless communication.

The CPU 281 and the storage unit 282 may be integrated into a single unit. The CPU 281 may be incorporated in the sheet manufacturing apparatus 100, and the storage unit 282 may be provided in an external device such as an external computer. The storage unit 282 may be incorporated in the sheet manufacturing apparatus 100, and the CPU 281 may be provided in an external device such as an external computer.

The sheet manufacturing apparatus 100 includes a humidifying unit 231, a humidifying unit 232, a humidifying unit 233, a humidifying unit 234, a humidifying unit 235, and a humidifying unit 236. In addition, the sheet manufacturing apparatus 100 includes a blower 261, a blower 262, and a blower 263.

In the sheet manufacturing apparatus 100, a raw material supply process, a crushing process, a defibrating process, a sorting process, a first web forming process, a dividing process, a mixing process, a loosening process, a second web forming process, a sheet forming process, and a cutting process are executed in this order.

Hereinafter, the configuration of each unit will be described.

The raw material supply unit 11 is a portion that performs a raw material supply process of supplying a raw material M1 to the crushing unit 12. The raw material M1 is a sheet-like material made of a fiber-containing material containing a cellulose fiber. The cellulose fiber may be any fibrous material containing cellulose as a main compound (cellulose in the narrow sense), and may contain hemicellulose and lignin in addition to cellulose (cellulose in the narrow sense). The form of the raw material M1 is not limited, such as woven fabric or non-woven fabric. The raw material M1 may be, for example, recycled paper recycled and manufactured by defibrating used paper, synthetic paper YUPO paper (registered trademark), or not recycled paper. In the present embodiment, the raw material M1 is used paper which is used or unnecessary.

The crushing unit 12 is a portion that performs a crushing process of crushing the raw material M1 supplied from the raw material supply unit 11 in the air such as the atmosphere. The crushing unit 12 has a pair of crushing blades 121 and a chute 122.

The pair of crushing blades 121 rotate in the opposite direction to each other so that the raw material M1 therebetween can be crushed, that is, cut into coarse debris M2. The shape and size of the coarse debris M2 are preferably suitable for the defibrating process in the defibrating unit 13. For example, a small piece having a side length 100 mm or less is preferable, and a small piece having a length of 10 mm or more and 70 mm or less is more preferable.

The chute 122 is disposed below the pair of crushing blades 121 and has, for example, a funnel shape. Thereby, the chute 122 can receive the coarse debris M2 crushed and dropped by the crushing blade 121.

The humidifying unit 231 is disposed adjacent to the pair of crushing blades 121 above the chute 122. The humidifying unit 231 humidifies the coarse debris M2 in the chute 122. The humidifying unit 231 is configured of a vaporizing (or hot air vaporizing type) humidifier which has a filter (not shown) containing moisture and supplies humidified air with increased humidity to the coarse debris M2 by passing air through the filter. By supplying the humidified air to the coarse debris M2, it is possible to suppress the coarse debris M2 from adhering to the chute 122 and the like due to static electricity.

The chute 122 is coupled to the defibrating unit 13 via a pipe 241. The coarse debris M2 collected in the chute 122 is passed through the pipe 241 and is transported to the defibrating unit 13.

The defibrating unit 13 is a portion that performs a defibrating process of defibrating the coarse debris M2 in the air, that is, dry. By the defibrating process in the defibrating unit 13, a defibrated material M3 can be generated from the coarse debris M2. Here "defibrating" means unraveling the coarse debris M2 formed by binding a plurality of fibers into individual fibers. Then, the unraveled material becomes the defibrated material M3. The shape of the defibrated material M3 is linear or strip-shaped. Moreover, the defibrated materials M3 may exist in a state in which they are intertwined into a lump.

In the present embodiment, for example, the defibrating unit 13 is configured of an impeller mill having a rotor that rotates at a high speed and a liner that is located on the outer periphery of the rotor. The coarse debris M2 flowed into the defibrating unit 13 is sandwiched between the rotor and the liner and defibrated.

The defibrating unit 13 can generate a flow of air from the crushing unit 12 toward the sorting unit 14, that is, an airflow, by rotation of the rotor. Thereby, the coarse debris M2 can be sucked into the defibrating unit 13 from the pipe 241. After the defibrating process, the defibrated material M3 can be sent out to the sorting unit 14 via a pipe 242.

The blower 261 is installed in the middle of the pipe 242. The blower 261 is an airflow generator that generates an airflow toward the sorting unit 14. Thereby, the delivery of the defibrated material M3 to the sorting unit 14 is promoted.

The sorting unit 14 is a portion that performs a sorting process of sorting the defibrated material M3 according to the length of the fibers. In the sorting unit 14, the defibrated material M3 is sorted into a first sorted item M4-1 and a second sorted item M4-2 longer than the first sorted item M4-1. The first sorted item M4-1 has a size suitable for the subsequent manufacture of the sheet S. The average length is preferably 1 µm or more and 30 µm or less. On the other hand, the second sorted item M4-2 includes, for example, those in which defibration is insufficient or those in which defibrated fibers are excessively aggregated.

The sorting unit 14 has a drum unit 141 and a housing unit 142 that houses the drum unit 141.

The drum unit 141 is a sieve that is formed of a cylindrical mesh body and rotates about its central axis. The defibrated material M3 flows into the drum unit 141. By rotating the drum unit 141, the defibrated material M3 smaller than the mesh opening of the net is sorted as the first sorted item M4-1, and the defibrated material M3 larger than the mesh opening of the net is sorted as the second sorted item M4-2.

The first sorted item M4-1 falls from the drum unit 141.

On the other hand, the second sorted item M4-2 is sent out to a pipe 243 coupled to the drum unit 141. The pipe 243 is coupled to the pipe 241 on the opposite side of the drum unit 141, that is, on the downstream. The second sorted item M4-2 passed through the pipe 243 merges with the coarse debris M2 in the pipe 241 and flows into the defibrating unit 13 with the coarse debris M2. Thereby, the second sorted item M4-2 is returned to the defibrating unit 13 and is subjected to the defibrating process with the coarse debris M2.

The first sorted item M4-1 from the drum unit 141 falls while being dispersed in the air and travels toward the first web forming unit 15 located below the drum unit 141. The first web forming unit 15 is a portion that performs a first web forming process of forming a first web M5 from the first sorted item M4-1. The first web forming unit 15 has a mesh belt 151, three stretching rollers 152, and a suction unit 153.

The mesh belt 151 is an endless belt, and the first sorted item M4-1 is deposited thereon. The mesh belt 151 is wound around the three stretching rollers 152. Then, the first sorted item M4-1 on the mesh belt 151 is transported downstream by the rotational drive of the stretching roller 152.

The first sorted item M4-1 has a size larger than the mesh opening of the mesh belt 151. Thereby, the first sorted item M4-1 is restricted from passing through the mesh belt 151 and can be deposited on the mesh belt 151. Since the first sorted item M4-1 is deposited on the mesh belt 151 and is transported downstream along with the mesh belt 151, it is formed as a layered first web M5.

For example, dust and dirt may be mixed in the first sorted item M4-1. Dust and dirt may be generated by crushing or defibration, for example. Such dust and dirt are collected in the collection unit 27 described later.

The suction unit 153 is a suction mechanism that sucks air from below the mesh belt 151. Thereby, dust and dirt passed through the mesh belt 151 can be sucked together with air.

The suction unit 153 is coupled to the collection unit 27 via a pipe 244. The dust and dirt sucked by the suction unit 153 are collected by the collection unit 27.

A pipe 245 is further coupled to the collection unit 27. Moreover, the blower 262 is installed in the middle of the pipe 245. By the operation of the blower 262, a suction force can be generated in the suction unit 153. Thereby, the formation of the first web M5 on the mesh belt 151 is promoted. The first web M5 is one from which dust and dirt and the like are removed. Moreover, dust and dirt pass through the pipe 244 and reach the collection unit 27 by the operation of the blower 262.

The housing unit 142 is coupled to the humidifying unit 232. The humidifying unit 232 is configured of a vaporizing humidifier similar to the humidifying unit 231. Thereby, humidified air is supplied into the housing unit 142. The humidified air can humidify the first sorted item M4-1, and it is possible to suppress the first sorted item M4-1 from adhering to the inner wall of the housing unit 142 due to electrostatic force.

The humidifying unit 235 is disposed at the downstream of the sorting unit 14. The humidifying unit 235 is configured of an ultrasonic humidifier that sprays water. Thereby, moisture can be supplied to the first web M5, and the moisture content of the first web M5 is adjusted. By the adjustment, the adsorption of the first web M5 to the mesh belt 151 due to electrostatic force can be suppressed. Thereby, the first web M5 is easily peeled off from the mesh belt 151 at a position where the mesh belt 151 is folded back by the stretching roller 152.

The subdividing unit 16 is disposed at the downstream of the humidifying unit 235. The subdividing unit 16 is a portion that performs a dividing process of dividing the first web M5 peeled off from the mesh belt 151. The subdividing unit 16 has a propeller 161 that is rotatably supported and a housing unit 162 that houses the propeller 161. The first web M5 can be divided by the rotating propeller 161. The divided first web M5 becomes a subdivided body M6. Moreover, the subdivided body M6 descends in the housing unit 162.

The housing unit 162 is coupled to the humidifying unit 233. The humidifying unit 233 is configured of a vaporizing humidifier similar to the humidifying unit 231. Thereby, humidified air is supplied into the housing unit 162. The humidified air can also suppress the subdivided body M6 from adhering to the propeller 161 and the inner wall of the housing unit 162 due to electrostatic force.

The mixing unit 17 is disposed at the downstream of the subdividing unit 16. The mixing unit 17 is a portion that performs a mixing process of mixing the subdivided body M6 and a resin P1. The mixing unit 17 has a resin supply unit 171, a pipe 172, and a blower 173.

The pipe 172 couples the housing unit 162 of the subdividing unit 16 and a housing unit 182 of the loosening unit 18, and is a path through which a mixture M7 of the subdivided body M6 and the resin P1 passes.

The resin supply unit 171 is coupled in the middle of the pipe 172. The resin supply unit 171 has a screw feeder 174. By the rotational drive of the screw feeder 174, the resin P1 can be supplied to the pipe 172 as powder or particles. The resin P1 supplied to the pipe 172 is mixed with the subdivided body M6 to become the mixture M7.

The resin P1 binds the fibers together in a later step. For example, a thermoplastic resin, a curable resin, and the like can be used, but a thermoplastic resin is preferably used. Examples of thermoplastic resin include AS resin; ABS resin; polyolefin such as polyethylene, polypropylene, and ethylene-vinyl acetate copolymer (EVA); modified polyolefin; acrylic resin such as polymethyl methacrylate; polyester such as polyvinyl chloride, polystyrene, polyethylene terephthalate, and polybutylene terephthalate; polyamide (nylon) such as nylon 6, nylon 46, nylon 66, nylon 610, nylon 612, nylon 11, nylon 12, nylon 6-12, and nylon 6-66; polyphenylene ether; polyacetal; polyether; polyphenylene oxide; polyether ether ketone; polycarbonate; polyphenylene sulfide; thermoplastic polyimide, polyether imide; liquid crystal polymer such as aromatic polyester; and various thermoplastic elastomers such as styrene-based elastomer, polyolefin-based elastomer, polyvinyl chloride-based elastomer, polyurethane-based elastomer, polyester-based elastomer, polyamide-based elastomer, polybutadiene-based elastomer, trans-polyisoprene-based elastomer, fluororubber-based elastomer, and chlorinated polyethylene-based elastomer. One or more of these materials may be used independently or in combination. Preferably, as the thermoplastic resin, polyester or one containing the same is used.

What is supplied from the resin supply unit 171 may include, for example, a colorant for coloring the fiber, an aggregation inhibitor for suppressing aggregation of the fiber and resin P1, a flame retardant for making fibers hard to burn, a paper strength enhancer for enhancing the paper strength of sheet S, and the like in addition to the resin P1. A combination of these components previously contained in the resin P1 may be supplied from the resin supply unit 171.

In the middle of the pipe 172, the blower 173 is installed downstream from the resin supply unit 171. The subdivided body M6 and the resin P1 are mixed by the action of the rotating portion such as a blade of the blower 173. Moreover, the blower 173 can generate airflow toward the loosening unit 18. With this airflow, the subdivided body M6 and the resin P1 can be stirred in the pipe 172. Thereby, the mixture M7 can flow into the loosening unit 18 in a state where the subdivided body M6 and the resin P1 are uniformly dispersed. Moreover, the subdivided body M6 in the mixture M7 is loosened in the process of passing through the pipe 172 and becomes finer fibrous.

The pipe 172 is provided with a branching portion 175 downstream from the blower 173 as shown in FIG. 2, and is branched into two pipes 172A and 172B via the branching portion 175. Moreover, the pipe 172A is coupled to the end surface of a drum unit 181 on the −y axis side, and the pipe 172B is coupled to the end surface of the drum unit 181 of the loosening unit 18 on the +y axis side.

The loosening unit 18 is a portion that performs a loosening process of loosening fibers intertwined in the mixture M7. The loosening unit 18 has the drum unit 181 and the housing unit 182 that houses the drum unit 181.

The drum unit 181 has a cylindrical shape, and a large number of through-holes 181a are provided on the outer peripheral surface thereof. The drum unit 181 is a sieve that rotates around its central axis O. On the end surface of the drum unit 181 on the −y axis side, an opening 181b that communicates the inside and outside is formed at the central portion thereof, and the opening 181b is coupled to the downstream end portion of the pipe 172A. On the other hand, on the end surface of the drum unit 181 on the +y axis side, an opening 181c that communicates the inside and outside is formed at the central portion thereof, and the opening 181c is coupled to the downstream end portion of the pipe 172B.

With such a configuration, the mixture M7 can flow into the drum unit 181 from the pipe 172A and the pipe 172B. Then, when the drum unit 181 rotates, the mixture M7 is mixed and stirred, and fibers and the like smaller than the through-hole 181a can pass through the drum unit 181. Thereby, the mixture M7 is loosened and dispersed in the air.

The housing unit 182 has a semi-cylindrical portion 182A and a square cylindrical portion 182B. The semi-cylindrical portion 182A covers approximately half of the drum unit 181, that is, a portion on the +z axis side via the central axis O. The square cylindrical portion 182B covers a portion between the drum unit 181 and a mesh belt 191. Thereby, the airflow between the drum unit 181 and the mesh belt 191 generated by the suction force generated by a suction unit 193 can be stabilized. Therefore, it contributes to uniform dispersion and uniform deposition on the mesh belt 191.

As shown in FIG. 1, the housing unit 182 is coupled to the humidifying unit 234. The humidifying unit 234 is configured of a vaporizing humidifier similar to the humidifying unit 231. Thereby, humidified air is supplied into the housing unit 182. The humidified air can humidify the inside of the housing unit 182, and thereby, it is possible to suppress the mixture M7 from adhering to the inner wall of the housing unit 182 due to electrostatic force.

The mixture M7 loosened in the drum unit 181 falls while being dispersed in the air, and travels to a second web forming unit 19 located below the drum unit 181. The second web forming unit 19 is a portion that performs a second web forming process of forming a second web M8 from the mixture M7. The second web forming unit 19 has the mesh belt 191, a stretching roller 192, and the suction unit 193.

The mesh belt 191 is an endless belt on which the mixture M7 is deposited. The mesh belt 191 is wound around four stretching rollers 192. Then, the mixture M7 on the mesh belt 191 is transported downstream by the rotational drive of the stretching roller 192.

Most of the mixture M7 on the mesh belt 191 has a size larger than the mesh opening of the mesh belt 191. Thereby, the mixture M7 is restricted from passing through the mesh belt 191 and can therefore be deposited on the mesh belt 191. Moreover, since the mixture M7 is deposited on the mesh belt 191 and transported downstream with the mesh belt 191, it is formed as a linear second web M8.

The suction unit 193 is a suction mechanism that sucks air from below the mesh belt 191. Thereby, the mixture M7 can be sucked on to the mesh belt 191, and the deposition of the mixture M7 on the mesh belt 191 is promoted.

A pipe 246 is coupled to the suction unit 193. Moreover, the blower 263 is installed in the middle of the pipe 246. By the operation of the blower 263, a suction force can be generated in the suction unit 193.

The humidifying unit 236 is disposed at the downstream of the loosening unit 18. The humidifying unit 236 is configured of an ultrasonic humidifier similar to the humidifying unit 235. Thereby, moisture can be supplied to the second web M8, and the moisture content of the second web M8 is adjusted. By the adjustment, the adsorption of the second web M8 to the mesh belt 191 due to electrostatic force can be suppressed. Thereby, the second web M8 is easily peeled off from the mesh belt 191 at a position where the mesh belt 191 is folded back by the stretching roller 192.

The amount of water added to the humidifying units 231 to the humidifying unit 236 (total moisture content) is preferably 0.5 parts by mass or more and 20 parts by mass or less with respect to 100 parts by mass of the material before humidification, for example.

The sheet forming unit 20 is disposed at the downstream of the second web forming unit 19. The sheet forming unit 20 is a portion that performs a sheet forming process of forming the sheet S from the second web M8. The sheet forming unit 20 has a pressurizing unit 201 and a heating unit 202.

The pressurizing unit 201 has a pair of calender rollers 203 and can press the second web M8 between the calender rollers 203 without heating. Thereby, the density of the second web M8 is increased. The degree of heating at this time is preferably, for example, a degree that the resin P1 is not melted. Then, the second web M8 is transported toward the heating unit 202. One of the pair of calender rollers 203 is a main driving roller driven by the operation of a motor (not shown), and the other is a driven roller.

The heating unit 202 has a pair of heating rollers 204 and can apply pressure while heating the second web M8 between the heating rollers 204. By the heating and pressing, in the second web M8, the resin P1 is melted and the fibers are bound together via the melted resin P1. Thereby, the sheet S is formed. Then, the sheet S is transported toward the cutting unit 21. One of the pair of heating rollers 204 is a main driving roller driven by the operation of a motor (not shown), and the other is a driven roller.

The cutting unit 21 is disposed at the downstream of the sheet forming unit 20. The cutting unit 21 is a portion that performs a cutting process of cutting the sheet S. The cutting unit 21 has a first cutter 211 and a second cutter 212.

The first cutter 211 cuts the sheet S in a direction that intersects the transport direction of the sheet S, in particular, a direction that is orthogonal.

The second cutter 212 cuts the sheet S in a direction parallel to the transport direction of the sheet S at the downstream of the first cutter 211. This cutting is to remove unnecessary portions at both end portions (end portions in the y axis direction) of the sheet S and to adjust the width of the sheet S. The cut and removed portion is called "edge".

By the cutting performed with the first cutter 211 and the second cutter 212, a sheet S having a desired shape and size can be obtained. Then, the sheet S is further transported downstream and accumulated in the stock unit 22.

The pipe 172 coupled to the drum unit 181 is branched into the pipe 172A and the pipe 172B via the branching portion 175. The sheet manufacturing apparatus 100 is configured to form a swirling airflow (swirling flow) in the pipe 172A and the pipe 172B and supply the mixture M7 into the drum unit 181 together with the swirling flow. Hereinafter, this will be described. Since the pipe 172A and the pipe 172B are in a symmetrical relationship with respect to the xz plane and have substantially the same configuration, the pipe 172A will be described representatively below.

The pipe 172A has a first pipe 3 having a first pipe axis O1 and a second pipe 4 having a second pipe axis O2, and these are coupled in order from the upstream. Moreover, an airflow changing unit 5 is provided in the first pipe 3. The first pipe 3, the second pipe 4, and the airflow changing unit 5 constitute a swirling flow generation device 1 of the present disclosure. The swirling flow generation device 1 and the drum unit 181 constitute a deposition device 10 of the present disclosure.

The first pipe 3 has a linear shape, and the first pipe axis O1 thereof has a linear shape. An inner diameter d1 of the first pipe 3 is not particularly limited, but is preferably 30 mm or more and 100 mm or less, and more preferably 40 mm or more and 80 mm or less.

The second pipe 4 has a shape in which the middle in the longitudinal direction is bent at two places. The first pipe 3 is coupled near an upstream end portion of the second pipe 4, and the downstream end portion is coupled to the opening 181b of the drum unit 181.

The second pipe 4 has an upstream pipe 41 which is an upstream portion and is coupled to the first pipe 3, an intermediate pipe 42, and a downstream pipe 43 located at the downstream and coupled to the drum unit 181. The pipe axis of the upstream pipe 41 is the second pipe axis O2. The direction of the second pipe axis O2 is different from that of the first pipe axis O1. In the present embodiment, they intersect and are orthogonal to each other. The first pipe axis O1 and the second pipe axis O2 may not be necessarily orthogonal.

In the present embodiment, the inner diameters d2 of the upstream pipe 41, the intermediate pipe 42, and the downstream pipe 43 are the same in the second pipe 4. The inner diameter d2 is not particularly limited, but is preferably larger than the inner diameter d1. Specifically, it is preferably 60 mm or more and 250 mm or less, and more preferably 80 mm or more and 200 mm or less.

The end portion of the upstream pipe 41 opposite to the intermediate pipe 42 is covered by a shielding member 44. The couple configuration of the first pipe 3 and the second pipe 4 is not limited to the illustrated configuration, and may be coupled via, for example, a bent joint, that is, an elbow pipe.

In such a pipe 172A, the airflow flowing down, that is, flowing the first pipe contains the mixture M7 in which the resin P1 is mixed in the defibrated material M3. As shown in FIG. 3, the airflow changing unit 5 which changes the airflow containing the mixture M7 is provided in the first pipe 3. The airflow changing unit 5 is composed of a plate member and has an orifice plate 51 having a circular opening 50. The orifice plate 51 may be configured integrally with the first pipe 3, may be configured separately and joined to each other, or may be configured to be detachable.

As shown in FIG. 4, the orifice plate 51 has the opening 50 formed of a through-hole penetrating in the thickness direction, and the center O5 of the opening 50 is provided eccentrically from the first pipe axis O1. In the present embodiment, the center O5 of the opening 50 is biased to the −x axis side. According to such a configuration, the following action can be obtained.

In FIGS. 3 to 5, the center of an airflow R containing the mixture M7, that is, a portion with highest flow velocity is indicated by an arrow. The center of the airflow R flowing down in the first pipe 3 is in a state substantially coincident with the first pipe axis O1 at the upstream of the orifice plate 51. When the airflow R passes through the opening of the orifice plate 51, the center of the airflow R passes through the center O5 of the opening 50 and flows down as it is in a state eccentric from the first pipe axis O1. Then, when it flows down into the second pipe 4, it moves toward the downstream while changing the course along the inner wall of the upstream pipe 41 of the second pipe 4. For this reason, the airflow R becomes a swirling flow in the upstream pipe 41, flows down the intermediate pipe 42 and the downstream pipe 43 in a swirling state, and enters the drum unit 181 via the opening 181b of the drum unit 181.

The same action occurs in the pipe 172B. The airflow R flowing down the pipe 172B also flows into the drum unit 181 via the opening 181c in a swirling state. For this reason, the airflow R flowing in from the opening 181b and the airflow R flowing in from the opening 181c merge as a swirling flow in the drum unit 181 to generate rotating airflow in the drum unit 181. Thereby, the mixture M7 containing the defibrated material M3 can be well mixed and stirred in the drum unit 181. Therefore, the mixture M7 can be dispersed uniformly as possible from each through-hole 181a of the drum unit 181. As a result, the second web M8 having a desired thickness distribution can be obtained, and thereby, a sheet S having a desired thickness distribution can be obtained.

Particularly, in the present embodiment, the above-described effect can be obtained by a simple configuration in which the orifice plate 51 is provided in the first pipe 3 regardless of whether it is integrated or separated. That is, a swirling flow can be formed with a simple configuration, and a sheet S having a desired thickness distribution can be obtained.

As described above, the pipe 172A and the pipe 172B are in a symmetrical relationship with respect to the xz plane, and the configuration is substantially the same. That is, the opening 50 of the orifice plate 51 is biased to the −x axis side also in the pipe 172B. For this reason, the direction of the swirling flow when viewed from the upstream is different in the pipe 172A and the pipe 172B. However, since they are coupled to different end surfaces of the drum unit 181, they are mixed in the drum unit 181 as swirling flows in the same direction. Thereby, the mixing and stirring of the mixture M7 in the drum unit 181 can be performed more satisfactorily.

In the present embodiment, the swirling directions of the airflow R flowing down from the pipe 172A and the pipe 172B, that is, the rotation direction and the rotation direction of the drum unit 181 are the same. Thereby, the mixing and stirring of the mixture M7 in the drum unit 181 can be performed more satisfactorily.

In the swirling flow generation device 1, when the cross-sectional area of the lumen of the first pipe 3 is S1 and the cross-sectional area of the lumen of the second pipe 4 is S2, S1<S2 is satisfied. Thereby, when the center of the airflow R eccentric in the first pipe 3 turns along the inner wall in the second pipe 4, it can be turned more. As a result, the flow velocity of the swirling flow can be increased, and the effect of the present disclosure can be obtained more significantly.

S2/S1 is preferably 1.1 or more and 10 or less, and more preferably 2 or more and 5 or less. Thereby, the above-described effect can be obtained more reliably. The effect of the present disclosure can be obtained even when S1≥S2.

In the swirling flow generation device 1, when the cross-sectional area of the lumen of the first pipe 3 is S1 and the opening area of the opening 50 is S3, S1/S3 is preferably 1.5 or more and 10 or less, and more preferably 2.5 or more and 6 or less. Thereby, the pipeline can be sufficiently narrowed in the opening 50, and the flow velocity can be increased at the opening 50. Therefore, the flow velocity of swirling flow in the second pipe 4 can be increased, and the effect of the present disclosure can be obtained more significantly.

As shown in FIG. 5, when the inner diameter of the second pipe 4 is d2 and the distance from the opening 50 to the second pipe axis O2 is L, L/d2 is preferably 0.5 or more and 5 or less, and more preferably 1 or more and 4 or less. Thereby, the effect of the present disclosure can be obtained more significantly. If L/d2 is too small, it is difficult for the airflow R to flow along the inner wall of the second pipe 4 immediately after passing through the opening 50, and the flow velocity of the swirling flow tends to decrease. On the other hand, if L/d2 is too large, the distance from the airflow R passing through the opening 50 to the second pipe 4 tends to be relatively long, and it may be difficult for the airflow R to pass through the eccentric position until it reaches the second pipe 4.

As described above, the swirling flow generation device 1 of the present disclosure includes the first pipe 3 having the first pipe axis O1 and through which gas passes, the second pipe 4 having the second pipe axis O2 in a direction different from the first pipe axis O1 and communicating with the downstream of the first pipe 3, and the airflow changing unit 5 which is the orifice plate 51 provided in the first pipe 3 and has the opening 50 eccentric from the first pipe axis O1. Thereby, a swirling flow can be formed in the second pipe 4 as the center of the airflow R passed through the opening 50 flows into the second pipe 4 at a position that is eccentric from the second pipe axis O2. Therefore, for example, the airflow R can be supplied into the drum unit 181 as a swirling flow. Since the airflow R flowing through the first pipe 3 contains the mixture M7 containing the defibrated material M3, the mixture M7 can be supplied in into the drum unit 181 on the swirling flow. Thereby, the mixture M7 can be satisfactorily mixed and stirred in the drum unit 181. Therefore, the mixture M7 can be dispersed uniformly as possible from each through-hole 181a of the drum unit 181. As a result, the second web M8 having a desired thickness distribution can be obtained, and thereby, a sheet S having a desired thickness distribution can be obtained. Moreover, the above-described effect can be achieved with a simple configuration in which the airflow changing unit 5 having the opening 50 is provided.

The airflow changing unit 5 includes the orifice plate 51 which is a plate member installed so as to block the lumen of the first pipe 3 and the opening 50 provided in the orifice plate 51. For this reason, the effect of the present disclosure can be obtained with a simple device configuration.

The deposition device 10 of the present disclosure includes the swirling flow generation device 1 of the present disclosure and the drum unit 181 that is installed at the downstream of the second pipe 4, has a plurality of through-holes 181a on the outer peripheral portion, and rotates around the central axis O. The downstream end portion of the second pipe 4 communicates with the inside of the drum unit 181. Thereby, the second web M8 having a desired thickness distribution can be manufactured while enjoying the advantages of the above-described swirling flow generation device 1.

The downstream end portion of the second pipe 4 is coupled to the opening 181b and the opening 181c on the end surface of the drum unit 181, and the rotation direction of the swirling flow and the rotation direction of the drum unit 181 are the same. Thereby, the mixture M7 can be further satisfactorily mixed and stirred in the drum unit 181. As a result, the effect of the present disclosure can be exhibited more significantly.

The diameter d of the opening 50 is not particularly limited, but is preferably 10% or more and 90% or less of the inner diameter d1 of the first pipe 3, and more preferably 20% or more and 80% or less. Thereby, the effect of the present disclosure can be obtained more significantly.

As shown in FIG. 4, when viewed from plan view of the orifice plate 51 or from the first pipe axis O1 direction, the acute angle formed between the line connecting the first pipe axis O1 and the center O5 and the second pipe axis O2 is preferably 0° or more and 90° or less, and more preferably 60° or more and 80° or less. Thereby, the effect of the present disclosure can be obtained more significantly.

The shape of the opening 50 is not limited to a perfect circle as illustrated, and may be, for example, an ellipse. Moreover, the center of the opening 50 may be located further on the outer peripheral side of the orifice plate 51 than in the illustrated configuration. In this case, depending on the diameter d of the opening 50, the opening 50 opens to the outer peripheral portion of the orifice plate 51, but such a form is also included in the present disclosure.

Second Embodiment

FIG. 6 is a longitudinal sectional view of a first pipe included in a second embodiment of the deposition device of the present disclosure. FIG. 7 is a cross-sectional view taken along line VII-VII in FIG. 6.

Hereinafter, the second embodiment of the swirling flow generation device and the deposition device of the present disclosure will be described with reference to FIGS. 6 and 7. Differences from the above-described embodiment will be mainly described, and description of similar matters will be omitted.

The present embodiment is the same as the first embodiment except that an airflow changing unit has a position adjusting mechanism.

As shown in FIG. 6, the airflow changing unit 5 includes a position adjusting mechanism 7 that adjusts the position of the opening 50 with respect to the first pipe axis O1. The position adjusting mechanism 7 is provided in the first pipe 3 and is configured by a holding groove 71 having a function of holding the orifice plate 51 rotatably. In the present embodiment, the holding groove 71 is a portion between a pair of flanges 711 provided on the inner wall of the first pipe 3. Thereby, the orifice plate 51 is rotatably held.

A portion of the pipe wall of the first pipe 3 corresponding to the holding groove 71 is provided with a slit 176 that penetrates through the pipe wall. The slit 176 has a width smaller than the width of the holding groove 71 and is provided in the entire circumferential direction of the first pipe 3.

In the present embodiment, the orifice plate 51 has an operation unit 52 that is formed so as to protrude from the end surface to the outer peripheral side. The operation unit 52 is inserted into the slit 176. The end portion of the operation unit 52 is located outside the outer peripheral surface of the first pipe 3.

According to such a present embodiment, as shown in FIG. 7, when the operation unit 52 is moved in the circumferential direction with a finger, the orifice plate 51 itself rotates and the position of the opening 50 can be adjusted. Therefore, the rotation direction of the swirling flow can be adjusted.

In the present embodiment, the configuration in which the opening 50 is manually adjusted is described. However, the present disclosure is not limited to this and may be configured to be performed automatically. For example, a configuration may be adopted in which a rotational drive source is coupled to the orifice plate 51 and the rotational drive source is controlled in accordance with the rotation direction of the drum unit 181 to determine the direction of the swirling flow.

In the present embodiment, the position of the circumferential opening 50 of the first pipe 3 is adjusted by rotation. However, the present disclosure is not limited to this, and for example, the orifice plate 51 may be slid in the radial direction of the first pipe 3 to adjust the radial position of the opening 50.

Third Embodiment

FIG. 8 is a perspective view of a first pipe and an airflow changing unit included in a third embodiment of the deposition device of the present disclosure.

Hereinafter, the third embodiment of the swirling flow generation device and the deposition device of the present disclosure will be described with reference to FIG. 8. Differences from the above-described embodiments will be mainly described, and description of similar matters will be omitted.

The present embodiment is the same as the first embodiment except that the configuration of the airflow changing unit is different.

As shown in FIG. 8, the airflow changing unit 5 has a mounting portion 53 that can selectively mount the orifice plate 51 which is a plurality of plate members having different conditions for the opening 50. In the present embodiment, the mounting portion 53 has a slit 177 that penetrates the pipe wall of the first pipe 3 and extends in the circumferential direction thereof. The width of the slit 177 is substantially the same as the thickness of the orifice plate 51. Moreover, the slit 177 is provided substantially a half circumference in the circumferential direction of the first pipe 3.

In the illustrated configuration, three orifice plates 51 are provided. When the orifice plate 51A, the orifice plate 51B, and the orifice plate 51C are set from the upper side in FIG. 8, the orifice plate 51A, the orifice plate 51B, and the orifice plate 51C have different conditions for the opening 50, that is, size and shape.

In the orifice plate 51A and the orifice plate 51B, the opening 50 has a circular shape, and the diameter of the opening 50 of the orifice plate 51A is larger than the diameter of the opening 50 of the orifice plate 51B. The orifice plate 51C has an oval shape, and the minor axis direction coincides with the radial direction of the orifice plate 51C.

In the present embodiment, the orifice plate 51A, the orifice plate 51B, and the orifice plate 51C can be selected and alternatively inserted into the slit 177 for mounting. When the orifice plate 51B is mounted, the flow velocity can be increased compared to a case where the orifice plate 51A is mounted, and the swirling flow with a higher flow velocity can be formed. When the orifice plate 51C is mounted, the flow velocity can be increased compared to the case where the orifice plate 51B is mounted, and a swirling flow with a higher flow velocity can be formed.

In the present embodiment, by selecting the orifice plate 51A, the orifice plate 51B, and the orifice plate 51C and alternatively inserting them into the slit 177 for mounting, the flow velocity of the swirling flow to be formed can be selected and adjusted.

As described above, the swirling flow generation device and the deposition device of the present disclosure are described with respect to the illustrated embodiments. However, the present disclosure is not limited to this, and each portion which constitutes the swirling flow generation device and the deposition device can be replaced with any component that can exhibit the same function. Moreover, any components may be added.

The swirling flow generation device and the deposition device of the present disclosure may be a combination of any two or more configurations and features of the above-described embodiments.

What is claimed is:

1. A deposition device comprising:
a swirling flow generation device including:
a first pipe having a first pipe axis and through which gas passes, an airflow of the first pipe containing a defibrated material,
a second pipe having a second pipe axis in a direction different from the first pipe axis and communicating with a region downstream of the first pipe, and
an airflow changing unit provided in the first pipe and having an opening eccentric from the first pipe axis, the airflow changing unit including a plate member installed so as to block a lumen of the first pipe, and the opening provided in the plate member; and
a drum installed downstream of the second pipe, having a plurality of through-holes on an outer peripheral portion, and rotating around a central axis, wherein
a downstream end portion of the second pipe communicates with an inside of the drum.

2. The deposition device according to claim 1, wherein when a cross-sectional area of a lumen of the first pipe is S1 and a cross-sectional area of a lumen of the second pipe is S2, S1<S2 is satisfied.

3. The deposition device according to claim 1, wherein when a cross-sectional area of a lumen of the first pipe is S1 and an opening area of the opening is S3, S1/S3 is 1.5 or more and 10 or less.

4. The deposition device according to claim 1, wherein when an inner diameter of the second pipe is d2 and a distance from the opening to the second pipe axis is L, L/d2 is 0.5 or more and 5 or less.

5. The deposition device according to claim 1, wherein the airflow changing unit includes a position adjusting mechanism that adjusts a position of the opening with respect to the first pipe axis.

6. The deposition device according to claim 1, wherein the airflow changing unit has a mounting portion configured to selectively mount a plurality of plate members having different conditions for the opening.

7. The deposition device according to claim 1, wherein the downstream end portion of the second pipe is coupled to an end surface of the drum, and a rotation direction of the swirling flow and a rotation direction of the drum are the same.

* * * * *